United States Patent [19]

Moeglich

[11] 4,326,935
[45] Apr. 27, 1982

[54] ELECTROCHEMICAL PROCESSES UTILIZING A LAYERED MEMBRANE

[75] Inventor: Karl Moeglich, Dunedin, Fla.

[73] Assignee: Innova, Inc., Clearwater, Fla.

[21] Appl. No.: 110,997

[22] Filed: Jan. 10, 1980

Related U.S. Application Data

[62] Division of Ser. No. 957,876, Nov. 6, 1978, Pat. No. 4,242,193.

[51] Int. Cl.$^3$ .................. B01D 57/02; C25B 1/22; C02F 1/46
[52] U.S. Cl. .................. 204/180 P; 204/103; 204/151
[58] Field of Search .................. 204/180 P, 97, 130, 204/151, 104, 103

[56] References Cited

U.S. PATENT DOCUMENTS

| | | | |
|---|---|---|---|
| 3,423,300 | 1/1969 | Joo et al. | 204/97 X |
| 3,481,851 | 12/1969 | Lancy | 204/97 X |
| 3,909,381 | 9/1975 | Ehrsam | 204/97 X |
| 4,030,989 | 6/1977 | Atmore et al. | 204/104 |
| 4,118,295 | 10/1978 | Korenowski et al. | 204/97 X |
| 4,144,145 | 3/1979 | Watanabe et al. | 204/97 X |
| 4,148,700 | 4/1979 | Eddleman | 204/130 |

FOREIGN PATENT DOCUMENTS 7529044 9/1975 France .

*Primary Examiner*—Howard S. Williams
*Attorney, Agent, or Firm*—Cushman, Darby & Cushman

[57] ABSTRACT

The invention relates to a membrane assembly and processes for the utilization of the membrane assembly, or membrane assemblies having like properties. The membrane assembly comprises intermixed layers of capillary material and high dielectric constant impermeable material, forming capillary channels parallel to the direction of ion transport through the membrane. The membrane is anion permeable, does not have membrane potential and will not foul even over extended operation, allows cross-flow of anions and cations, and is highly efficient. It is possible to remove complex metals from any contaminated acid by electrodialysis, such as removing vanadium and uranium in recoverable form from contaminated phosphoric acid, while producing food grade phosphoric acid in the process. Additionally, simple metals may be removed from mine waste liquids (from leaching), chlorine can be produced from a chloride containing salt, and chromium can be removed from chromium contaminated water by electrolysis. Milling sludge can be treated to form water, caustic, and acid, and mineralized water can be treated to form de-mineralized water, by subjecting the feed liquids to electrodialysis.

13 Claims, 15 Drawing Figures

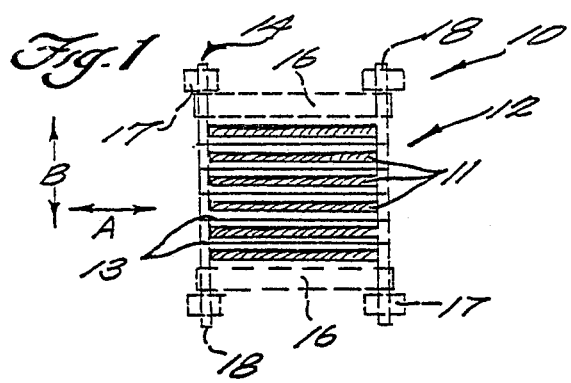
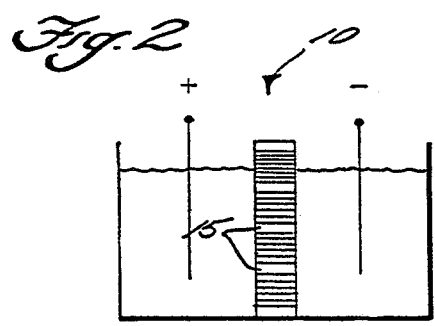
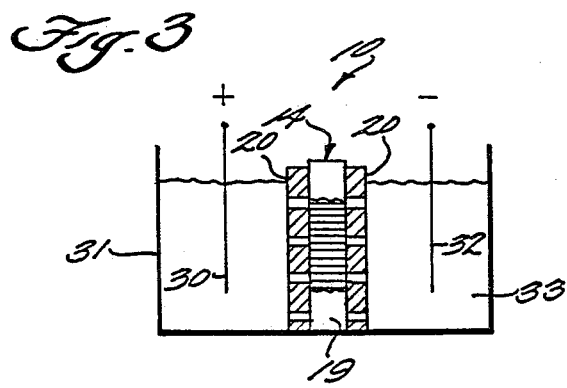
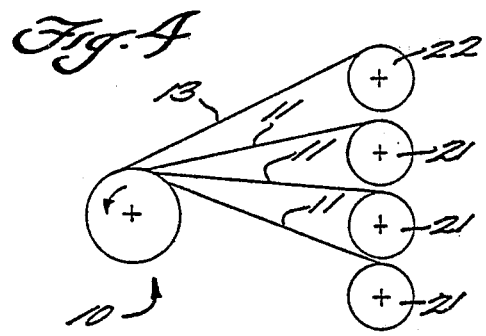
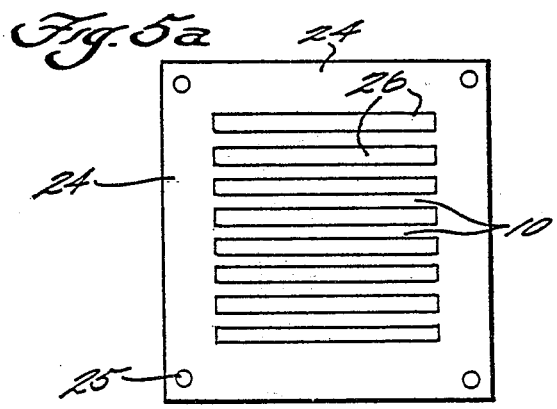
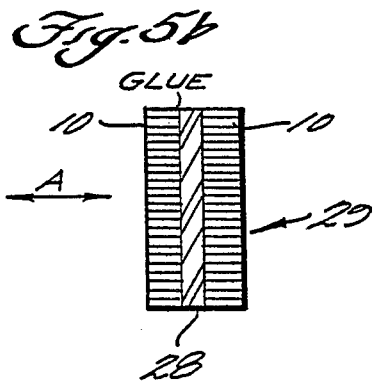
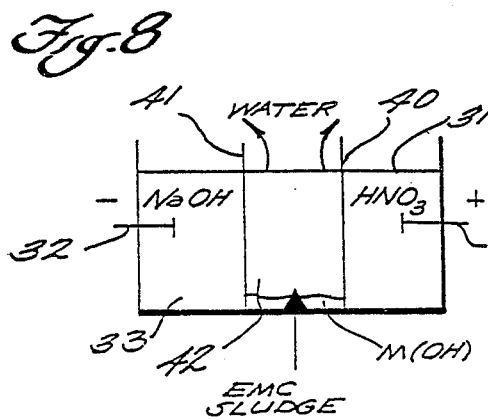
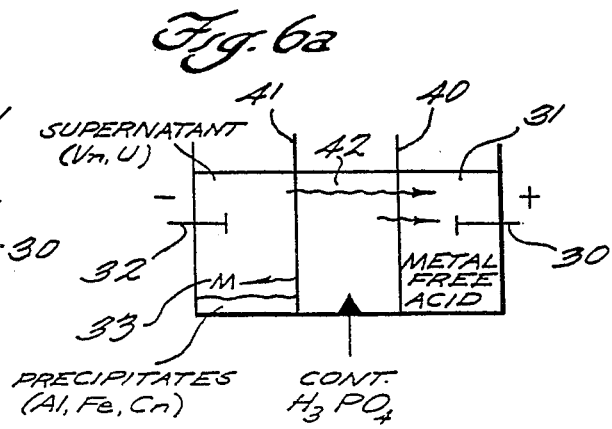

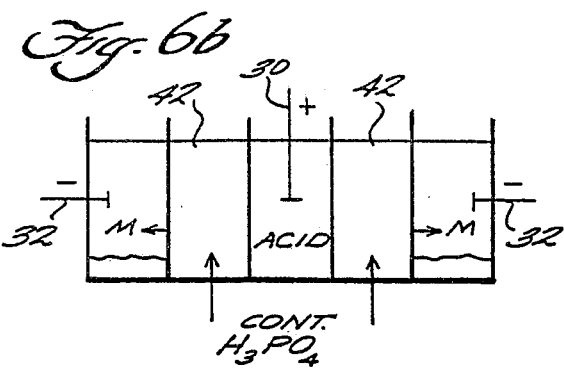
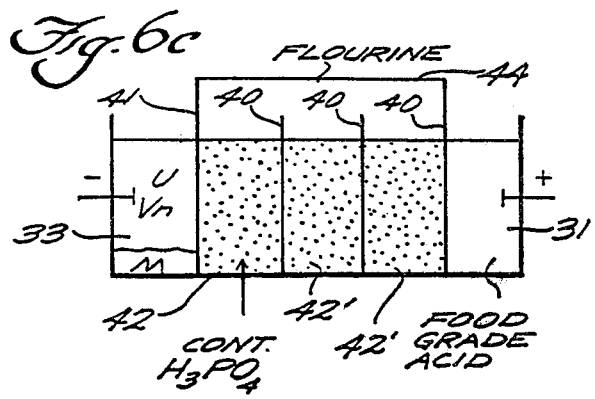
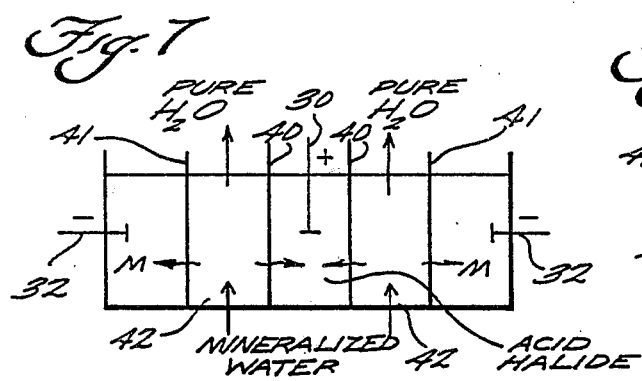
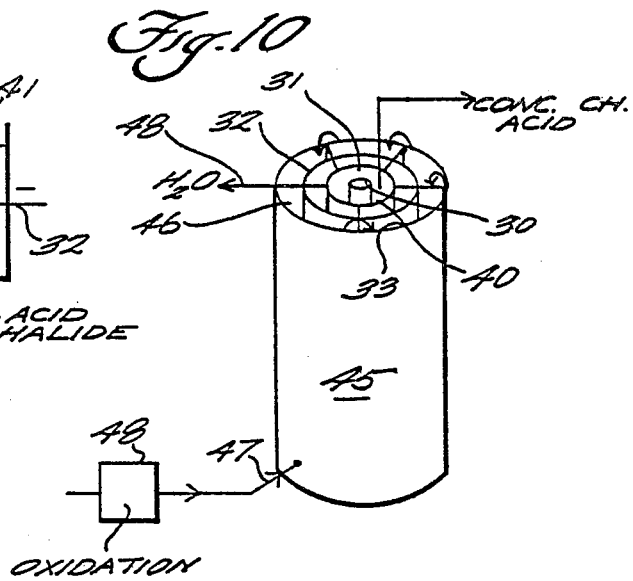
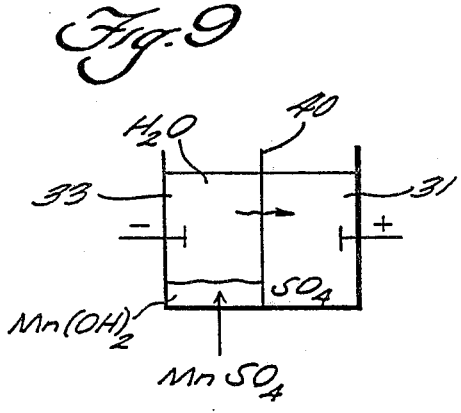
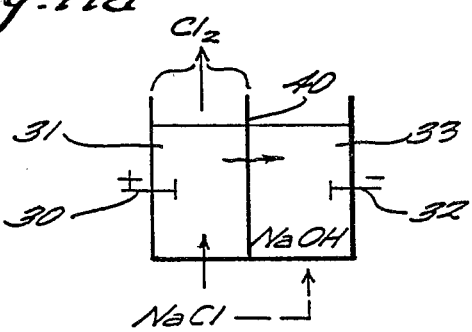
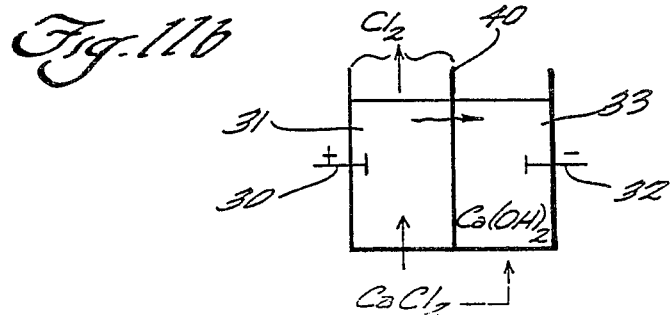

ELECTROCHEMICAL PROCESSES UTILIZING A LAYERED MEMBRANE

This is a division of application Ser. No. 957,876, filed Nov. 6, 1978, now U.S. Pat. No. 4,242,193.

BACKGROUND SUMMARY OF THE INVENTION

The invention relates to a membrane assembly for electrochemical processes, and to processes that may be practiced utilizing the membrane assembly of the invention, or a membrane assembly having like properties. An important feature of the membrane assembly of the present invention is that it allows the passage of anions therethrough, while effectively retarding the passage of water therethrough. The membrane assembly according to the present invention is capable of continuous long-term operation. The term "extended operation", as used in the present specification and claims is intended to mean successful operation over at least hundreds of hours, if not months and years.

In the past there have been numerous proposals for anion permeable membranes for use in electrochemical cells, such as "amberlite" resins, formed by bonding together resin particles, beads or granules. Such membranes, and like ion exchange membranes, are not capable of extended operation, fouling quickly, and require the application of such a large amount of energy as to be totally impractical, can easily be clogged, can react chemically with ions transmitted thereby, are highly susceptible to radiation damage, pass hydration water, are subject to swelling and/or are permselective.

According to the membrane assembly of the present invention, however, it is possible to provide a membrane which avoids the disadvantages of prior art anion-selective membranes and additionally is superior in many respects to conventional cation-permeable membranes. The membrane assembly, according to the present invention, is anion-permeable; it will not readily pass water; allows cation and anion cross-flow (is not permselective); is inexpensive, simple to make, and uses inexpensive and easy-to-make materials without any special processing; is generally not degraded by radioactivity, providing generally excellent radioactive ion separation; does not swell as a result of chemical reactions therein; is not susceptible to clogging or ready degradation; does not have a membrane potential (is free of anions and cations), therefore does not effect an increase in the water head on one side of the membrane (with associated overflow problems), except for very weak electrolytes; has increased electrical efficiency (high Faraday current efficiency with low voltage drop); and can be constructed of a variety of materials and configurations, therefore the exact material and design parameters can be chosen to exactly fit a particular situation. Additionally, utilized in special forms, all back-diffusion is prevented, and when utilized in particular cell configurations, has a mass-transfer efficiency of well over 100% (e.g. 170%), caused by the combination of electrolytical current-efficiency and electro-pherotic effects.

The membrane assembly according to the present invention comprises a plurality of layers of substantially void-free capillary material, each layer being thin enough so that it retards the passage of water therethrough, and thick enough so that it allows passage of ions therethrough, the capillary material having a positive angle of wetting; and means for forming the capillary material into directed capillary channels allowing passage of anions and cations therethrough, and means for preventing cross-flow of water and ions between the capillary channels. The forming and preventing means preferably comprises a plurality of separation layers of inert and impermeable material, having a high dielectric constant and smooth surfaces, and means for maintaining the capillary and separation layers in position so that the separation layers are interposed with the layers of capillary material, all of the layers being substantially parallel, so that anion and cation transport across the assembly through capillary material layers takes place, but ion and water transport across the separation layers does not take place. The capillary material may be chosen from a wide variety of conventional capillary materials, including paper, asbestos, wood, synthetic felts, and polyester and polypropylene woven or non-woven webs, and normally will be chosen so that it has a thickness of about 0.001 to 0.03 inches. In order to decrease the voltage drop, while still providing proper functioning, the capillary material normally has a dimension in the direction of ion transport of about 0.1 to 1.5 inches. The separation layers may be comprised of a wide variety of conventional inert and impermeable material, having high dielectric constant, such as non-conducting plastic films (preferably polyethylene film), rigid plastic plates, ceramic and glass.

In order to prevent essentially all back-diffusion, and for other purposes, a membrane assembly according to the present invention may be provided in combination with a second said assembly and a film membrane assembly, such as described in my patent application Ser. No. 814,715, filed July 11, 1977, now U.S. Pat. No. 4,124,458, the disclosure of which is hereby incorporated by reference in the present application. The film membrane assembly comprises a film of substantially water-impermeable, ion-impermeable, insulating material having a thickness of about 0.001 to 1 mm. That combination includes means (e.g. glue) for maintaining the film membrane assembly sandwiched between the capillary assemblies, with the capillary assemblies in intimate contact with the film and with the film being disposed substantially perpendicular to the direction of ion transport across the capillary assemblies. The capillary membrane assemblies disposed on either side of the film membrane comprise means for providing a continuation of the boundary layer thereof and for eliminating membrane potential and, thus, fouling of the membrane.

According to the present invention, electrochemical cells are provided comprising an anode, disposed in an anode chamber; a cathode, disposed in a cathode chamber; and a membrane assembly, disposed between the anode and the cathode, the membrane assembly comprising an anion permeable, semi-permeable or water impermeable, non-permselective membrane, capable of providing passage of anions thereacross over extended operation without destructive swelling, clogging, chemical reaction, or consumption thereof. The various chambers and membranes can have a wide variety of configurations. For instance, the membranes may be planar, curvilinear in the dimension perpendicular to ion transport (i.e. cylindrical or tubular), curvilinear in the direction of ion transport (i.e. waviform), and may be provided as a large membrane with the anode and cathode chambers defined by cutouts in the membrane (the areas of the membrane defining the anode and cathode chambers being treated so that they are effective to prevent diffusion of materials from the anode and cathode chambers thereinto).

An exemplary cell according to the present invention may comprise a dialysis cell, including at least two membranes disposed between the anode and the cathode, and defining at least one central chamber therebetween, at least the membrane adjacent the anode chamber comprising a said anion permeable membrane. In order to lower the resistivity of the cell, and for acting as an electrode, and for acting as a barrier to water and metal transport when no current is applied to the anode, a plurality of graphite particles may be disposed in at least one central chamber. Three central chambers preferably are provided defined by at least three of said anion permeable membranes, each of the central chambers including a plurality of graphite particles disposed therein. In utilizing such a dialysis chamber, it is possible to obtain mass transfer efficiencies of over 100% (e.g. 170%)!

According to another method of the present invention, it is possible to form uranium and vanadium rich liquid from conventional phosphoric acid contaminated with the same. Conventional phosphate rock and overburden contains from 50 to 200 ppm of uranium, and the uranium is also found in the phosphoric acid produced from the ore in the production of fertilizers, and the like, and is found in the gypsum pond water from the processing plant. According to the present invention, the phosphoric acid at any concentration below 100% is selected from some convenient point in the process (i.e. after filtration or just before evaporation) and is subjected to electrodialysis. In addition to producing uranium and/or vanadium rich liquids according to the present invention, aluminum, iron, magnesium, calcium, and the like are removed—resulting in a better grade of metals and fluorine depleted—phosphoric acid—and gypsum pond water, which heretofore has been a significant disposal problem is even harmlessly disposed of. In fact, even food-grade phosphoric acid can be produced. According to the method of uranium and/or vanadium removal of the present invention, an electrochemical cell is utilized comprising an anode chamber defined by an anion permeable membrane, a cathode chamber defined by a cathode permeable membrane, and at least one central chamber between the anode and cathode chambers. Water is originally provided in the anode chamber and gypsum pond water in the cathode chamber. Contaminated phosphoric acid is fed into the central chamber, a current is supplied to the anode sufficient to effect electrodialysis of the contaminated phosphoric acid, the uranium and/or vanadium rich supernatant liquid is withdrawn from the cathode chamber, and the metal-depleted phosphoric acid is withdrawn from the anode chamber. Where a plurality of central chambers are provided, each having a plurality of graphite particles disposed therein and defined by anion permeable membranes, food-grade phosphoric acid may be withdrawn from the anode chamber.

According to another method of the present invention, it is possible to effectively and efficiently, over extended operation, demineralize water by subjecting mineral-containing water to electrodialysis. The mineral-containing water may be hard water, sea water, salt water, or brackish water. Again, a dialysis cell as described above is utilized, and the method is practiced by providing water as the anolyte and catholyte, feeding the mineral-containing water into the bottom of the central chamber. Metal-containing liquids and metal precipitates are also produced in the cathode chamber, while halogens and acids are produced in the anode chamber.

According to a still further method of the present invention, it is possible to remove chrome from chrome-contaminated rinse water from chromium plating operations, etching liquid, or cooling tower effluent. It is possible to effect chrome removal to such an extent that the water produced has less than 0.05 pp. chromium, and the chromium is concentrated to a sufficient extent so that it is recoverable and/or reusable (e.g. chromic acid having a concentration of about 15% or more can be produced). The method is practiced utilizing an electrolysis cell which may comprise a plurality of series-connected cathode chambers being separated by an anion permeable membrane, and the method being practiced by feeding chromium-contaminated water to the bottom of the first cathode chamber, supplying current sufficient to effect electrolysis to the anode, withdrawing water having less than 0.01 ppm (i.e. 0.05 ppm) chromium from the top of the last cathode chamber, and withdrawing concentrated chromic acid from the anode chamber.

Further processes practiced according to the present invention include the treatment of simple metal in a recoverable form, by electrolysis, production of chlorine and/or metal from a chlorine-containing salt and water, treating ECM sludge to produce nitric acid and sodium hydroxide, by electrodialysis, and treating phosphate slime (clay and phosphate rock mixed together) to produce phosphoric acid.

It is the primary object of the present invention to provide an improved membrane assembly, and processes that are capable of efficiently and effectively, over extended operation, purifying phosphoric acid while producing uranium and/or vanadium rich liquids, demineralizing water, removing chromium from chromium-contaminated water, turning ECM sludge and other milling wastes into reusable components, producing chlorine, and producing phosphoric acid from phosphate slime. This and other objects of the invention will become clear from an inspection of the detailed description of the invention, and from the appended claims.

BRIEF DESCRIPTION OF THE DRAWINGS

FIG. 1 is a diagramatic exploded side view of an exemplary membrane assembly according to the present invention;

FIGS. 2 and 3 are modifications of the membrane assembly of FIG. 1 illustrated in use in electrochemical cells;

FIG. 4 is a diagramatic view illustrating the formation of an exemplary membrane assembly according to the present invention, that is curvilinear in the dimension perpendicular to the direction of ion transport;

FIG. 5a is a top plan view of an exemplary electrochemical cell arrangement formed by a machined membrane according to the present invention;

FIG. 5b is a side view of another embodiment of an exemplary membrane assembly according to the present invention utilizing the film membrane assembly between two capillary membrane assemblies;

FIGS. 6a, 6b and 6c are schematic illustrations of the purification of phosphoric acid that may be practiced according to the present invention;

FIG. 7 is a side view of an exemplary arrangement for demineralizing water according to the present invention;

FIG. 8 is a side view of an exemplary electrodialysis cell for purifying ECM sludge according to the present invention;

FIG. 9 is a side diagramatic view of an exemplary electrolysis cell for purifying simple metal mine waste;

FIG. 10 is a perspective diagramatic view of an exemplary electrochemical cell for removing chromium from chromium-contaminated water; and FIGS. 11a and 11b are electrolysis cells for chlorine production from NaCl and $CaCl_2$ respectively.

DETAILED DESCRIPTION OF THE INVENTION

An exemplary membrane assembly according to the present invention is illustrated generally at FIG. 10 in the drawings. The membrane assembly 10 comprises a plurality of layers 11 of substantially void-free capillary material, such as paper, asbestos, wood, synthetic felts and polyester and polyproplene woven or non-woven webs, a wide variety of other conventional capillary materials also being utilizable. The capillary material chosen has a positive angle of wetting—that is, water disposed in a capillary tube formed of the material will have a meniscus with peripheral wall-engaging portions elevated above the center of the water column. Each layer is thin enough so that it allows the passage of ions therethrough; preferably the capillary material layers each have a thickness of about 0.0001 to 0.030 inches (about 0.003 to 0.01 inches being preferred); and means 12 for forming the capillary material into directed capillary channels, allowing passage of anions and cations therethrough, and for preventing cross-flow of water and ions between the capillary channels. The means 12 preferably comprises a plurality of separation layers 13 of inert impermeable material, having a high dielectric constant and smooth surfaces (see FIG. 1 in particular), and means 14 for maintaining the capillary and separation layers 11, 13 in position so that separation layers 13 are interposed with layers 11, all of the layers 11, 13 being substantially parallel, so that anion and cation transport across said assembly 10 through said capillary material 11 takes place (in dimension A), but ion and water transport across separation layers 13 (in dimension B) does not take place. In order to minimize voltage drop across the assembly 10, it is formed so that the layers 11 have a dimension in the direction of ion transport (A) of about 0.1 to 1.5 inches (0.25 to 0.5 inches being preferred). Suitable materials for forming the separation layers 13 include non-conducting plastic films (e.g. polyethylene film 0.001 inches thick), rigid plastic plates (see 15 in FIG. 2), ceramic, and glass.

The maintaining means 14 may take a wide variety of forms, including those illustrated in FIGS. 1 and 3. In FIG. 1, means 14—which are shown in dotted line—comprise top and bottom plates 16 formed of inert, substantially rigid material, the plates 16 applying a compressive force on layers 11, 13 when the nuts 17 cooperating with bolts 18 passing through the plates 16 are tightened. The pressure applied by the plates 16 need not be large, but merely sufficient to provide a uniform membrane assembly, which is tight enough to minimize undesirable electrolyte diffusion and/or leakage across or through the membrane. The maintaining means may instead comprise, as illustrated schematically at 19 in FIG. 3, a resin or like structure for maintaining the layers 11, 13 together in unpressurized form, completely surrounding same. The membrane assembly is then inserted in electrolyte, where a moderate amount of swelling takes place due to the absorption of water by the capillary material layers, the internal pressure resulting being sufficient to prevent any undesired leakage or the like. No excessive swelling takes place since there are no chemical reactions within the membrane itself. Also, as illustrated in FIG. 3, perforated non-conducting (e.g. plastic) plates 20 may be provided on either side of the layers 11, 13 to support the membrane assembly.

The layers 11, 13 may be disposed so that a single layer 11 is provided between two layers 13, or multiple layers 11 (e.g. 3 or 5) may be provided between adjacent layers 13. Additionally, the maintaining means 14 may maintain layers in a curvilinear configuration in a dimension perpendicular to the direction A of ion transport, or even in a curvilinear configureation in the dimension A ion transport, without adversely affecting the operation of the membrane assembly. FIG. 4 is a schematic showing of the formation of a tubular or cylindrical membrane assembly 10', produced by winding a plurality of layers 11 of capillary material from rollers 21 with a layer 13 of separation material from roller 22.

FIGS. 5a and 5b are further illustrations of other exemplary forms a membrane assembly 10 can take according to the present invention. In FIG. 5a, the element 24 represents a plurality of large sheets of capillary material 11 and separation layers 13 stacked one on top of the other, and held together by bolts of the like passing through openings 25 therein, cutouts 26 being milled or otherwise formed, out of the member 24 to provide a series of membrane assemblies 10 spaced from each other, the cutouts 26 having electrolyte disposed therein and forming the anode and cathode chambers, and central chambers defined by membrane assemblies 10 between the anode and cathode chambers. In order to prevent diffusion of materials from the anode and cathode chambers into the material 24, the entire area of the member 24 aside from the portions 10 themselves is treated with a material effective to prevent diffusion into the member 24.

The membrane assembly illustrated in FIG. 5b is a sandwich membrane assembly utilizing the capillary membrane assemblies 10 according to the present invention as "forcers" for a film membrane such as shown in application Ser. No. 814,715. The capillary membrane assemblies disposed on either side of the film membrane comprise means for providing a continuation of the boundary layer thereof and for eliminating membrane potential and, thus, fouling of the membrane. The film membrane 28, as shown in application Ser. No. 814,715 comprises a film of substantially water-impermeable, ion-impermeable insulating material having a thickness of about 0.001 to 1 mm; polyethylene is a particularly suitable material. The assemblies 10 are disposed on one or both sides of the film 28 in intimate contact therewith, and means are provided for maintaining the film membrane 28 sandwiched between the capillary membrane assemblies 10, with the film 28 being disposed substantially perpendicular to the direction A of ion transport across the capillary membrane assemblies 10 forming a sandwich 29. The maintaining means may take any suitable form, such as glue around the periphery between the cooperating faces.

Exemplary electrochemical cells according to the present invention are illustrated schematically in FIGS. 2, 3 and 6a through 11d. Each electrochemical cell includes at least an anode 30 disposed in an anode chamber 31, a cathode 32 disposed in a cathode chamber 33, and a membrane assembly 10 disposed between the anode 30 and the cathode 32. In practice of the processes according to the present invention, generally the membrane assembly utilized can comprise the capillary membrane assembly 10 illustrated in FIGS. 1 through 4, a sandwich membrane 29 as illustrated in FIG. 5b, or a film membrane assembly as described in application Ser. No. 814,715. Under most circumstances, the capillary membrane assembly 10 is preferred since it suffers less damage from neutrons and alpha particles in the cell membrane, and since it is less expensive and easier to make. However, under some circumstances the film membrane or the sandwich membrane 29 will be preferred, the sandwich membrane 29 being especially useful in situations where it is necessary to prevent all backdiffusion, the film membrane and the sandwich membrane 29 being hydraulically impermeable.

In situations where an electrodialysis cell is used (.e. FIGS. 6, 7 and 8) at least the membrane 40 defining the anode chamber 31 will be an anion permeable membrane according to the present invention (capillary membrane assembly 10, sandwich membrane assembly 29, or film membrane as illustrated in Ser. No. 814,715). While it is preferred that the membrane 41 defining the cathode chamber 33 also comprise a membrane according to the invention, other cation permeable conventional membranes may also be utilized, although they may foul quickly. The membrane assembly according to the present invention comprises an anion permeable, non-ionic, semi-permeable or water impermeable, non-permselective membrane capable of providing the passage of anions thereacross over extended operation without destructive swelling, clogging, chemical reaction, or consumption thereof.

According to the present invention, the method of forming functional anionic liquid and cationic material from a source liquid or semi-solid containing ions with a Faraday efficiency of at least 90% is provided, consisting essentially of the step of effecting electrodialysis or electrolysis of the source liquid. Under some circumstances, the mass transfer efficiency is greater than about 150% (e.g. 170%). Where the source liquid contains acid and complex metals, the functional cationic material produced includes metal hydroxide precipitates and a supernatant liquid (e.g. pure water, uranium and/or vanadium solutions), and the functional anionic liquid produced includes metal-depleted acid. One practical method practiced according to the present invention is illustrated schematically in FIGS. 6a through 6c. This method effects the formation of uranium and/or vanadium rich liquid from phosphoric acid contaminated with same. Phosphoric acid produced during the manufacture of fertilizer or the like from phosphate rock generally is contaminated with significant amounts of uranium, vanadium, and metals, such as aluminum, iron, calcium and magnesium. Such metals are undesirable in the phosphoric acid, and if the metals are not removed, can result in an unacceptable end product. Additionally, the contaminants—especially uranium and vanadium—have significant commercial value themselves. Further, in the utilization of phosphoric acid, gypsum pond water containing $CaSO_4H_2O$ is produced which is a significant disposal problem. According to the present invention, by subjecting the contaminated phosphoric acid to electrodialysis, it is possible to produce uranium and/or vanadium rich liquids, metal-depleted or even food grade phosphoric acid, metal precipitates, and fluorine, while at the same time providing disposal of gypsum pond water.

One exemplary way of practicing the phosphoric acid treatment according to the present invention is illustrated in FIG. 6a, an electrodialysis cell being provided with a membrane 40 defining an anode chamber 31, and preferably with the membrane 41 also being a non-ionic, semi-permeable or water-permeable, non-permselective membrane as according to the present invention, capable of providing passage of ions there across over extended operation without destructive swelling, clogging, or chemical reaction or consumption thereof. Water may be provided as the original electrolyte in the anode chamber 31, and gypsum pond water may be provided as the electrolyte (providing a weak-acidic electrolyte) in the cathode chamber 33, and the contaminated phosphoric acid is fed into the central chamber 42. A current is supplied to the anodes sufficient to effect electrodialysis of the contaminated phosphoric acid, with the metals passing through the membrane 41 into the catholyte, and metal-depleted phosphoric acid—both from the gypsum pond water and from the contaminated acid in the central chamber 42—passing through the membrane 40. At the completion of the electrodialysis, the catholyte comprises a volume of metal precipitates (e.g. aluminum and iron precipitates), with the supernatant liquid containing uranium and vanadium in solution. In situations where the original phosphoric acid does not contain uranium, or vanadium, the supernatant will be pure water, however, virtually all phosphoric acid from phosphate rock contains at least some uranium. The final anolyte comprises metal-depleted phosphoric acid which is eminently suitable for fertilizer production or other uses. Once the final anolytes and catholytes are formed, the uranium and vanadium can be separated out by conventional processes (e.g. by utilizing ammonium carbonate, which produces ammonium uranyl tricarbonate, and after calcination, produces $U_3O_8$).

In the embodiment illustrated in FIG. 6b, the same process is carried out only in this situation a common anode 30 is provided for a pair of cathodes 32.

When it is desirable to produce food-grade acid from the contaminated phosphoric acid, an arrangement such as illustrated in FIG. 6c is utilized. In the apparatus of FIG. 6c, a plurality of central chambers 42, 42', are provided. Each of the central chambers 42' is defined by anion permeable membranes 40 according to the invention, the chamber 42 adjacent the cathode chamber 33 being defined on one side thereof by membrane 41. Each of the central chambers has a plurality of graphite particles disposed therein. The graphite particles lower the resistivity of the entire electrochemical cell, act as an electrode, and act as a barrier to water and metal transport when no current is supplied to the anode. The contaminated phosphoric acid is fed into chamber 42, the metal precipitates and uranium and/or vanadium rich liquids are produced in the cathode chamber 33, and in the anode chamber 31 food-grade acid is produced. While any number of central chambers 42, 42' may be provided it has been found that the three-chamber arrangement as illustrated in FIG. 6c is suitable for the production of food-grade acids. Additionally, if desired, fluorine produced in the central chambers 42, 42' may be collected (as by hood 44, shown diagramatically in FIG. 6c), which also is a commercial product.

According to the present invention a method of demineralizing water is also provided, the method consisting essentially of the step of subjecting the mineral-containing water to electrodialysis. This not only results in the production of pure water, but the minerals separated from the water may also be utilized, depending upon their value and their original concentration. Thus, utilizing the invention, it is possible to "mine" sea water, while producing fresh water therefrom. The mineralized water that is treated according to the present invention may be sea water, salt water, brackish water, hard water or the like.

In practicing the water-demineralizing method according to the present invention, apparatus as illustrated in FIG. 7 may be utilized. The apparatus is essentially identical to that illustrated in FIG. 6b, including a pair of "central" chambers 42, a pair of cathode chambers, and a common anode chamber. The mineralized water to be treated is fed into the bottom of the central chambers 42, a current sufficient to effect electrodialysis is supplied to the anode 30, and pure water is withdrawn from the top of chambers 42. The metals pass through membranes 41 into the cathode chambers, providing metal precipitates and/or metals in solution as the catholyte, and the acids and halides pass through membranes 40 into the anolyte.

According to the present invention, it is also possible to treat ECM sludge (electrochemical milling sludge) to produce nitric acid and sodium hydroxide. This is accomplished by electrodialysis, as illustrated schematically in FIG. 8. A suitable electrodialysis cell as shown in FIG. 8 includes the anode and cathode chambers defined by membranes 40, 41, and the central chamber 42. The ECM sludge is fed into the bottom of the central chamber 42, and a current sufficient to effect electrodialysis is supplied to the anode 30. The sodium ions in the sludge pass through the membrane 41 into the catholyte, forming sodium hydroxide with water originally provided as the catholyte, and the nitric acid passes through the membrane 40 into the anolyte, water originally being provided in the anode chamber 31. Pure water is produced at the top of the central chamber 42, which may be withdrawn if continuous processing is effected. Additionally, a small amount of air-dryable non-toxic (metal hydroxides) sludge is produced, which forms at the bottom of the central chamber 42.

According to a further method of the present invention, it is possible to treat simple metal waste liquids from mine leaching processes to obtain reusable leaching acid, water, and metal in a recoverable form. Such a method consists essentially of the step of subjecting the waste liquid to electrolysis. Suitable apparatus for practicing this method is illustrated schematically in FIG. 9, including anode and cathode chambers 31, 32 and an anion permeable, non-ionic, semi-permeable or water-impermeable, non-permselective membrane 40 according to the invention, capable of providing passage of anions thereacross over extended operation without destructive swelling, clogging, chemical reaction or consumption thereof. In practicing the method, the waste liquid is fed into the bottom of the cathode chamber 33, with pure water and metal precipitates (or perhaps metals in solution) being produced in chamber 33, and the anions passing through the membrane 40 to provide metal-depleted acid in the anode chamber 31.

The mine waste liquid recovery process according to the present invention is especially suitable for recovery of sulfuric acid and manganese hydroxide from waste liquid from manganese mining. The waste liquid comprises $MnSO_4$ in water, and sulfuric acid is produced in anode chamber 31, and pure water is produced as the supernatant liquid in cathode chamber 33, with $Mn(OH)_2$ precipitate formed in a cathode chamber 33. The sulfuric acid may then be reused for further leaching.

By practicing a further method according to the present invention, it is possible to recover chromium-contaminated water, producing concentrated chromic acid and essentially pure water. This is accomplished by subjecting the chromium-contaminated water to electrolysis, again preferably utilizing the anion permeable, non-ionic, semi-permeable or water-impermeable, non-permselective membrane according to the present invention, capable of providing passage of anions there across over extended operation without destructive swelling or clogging, chemical reaction or consumption thereof. A preferred apparatus for practicing this method is illustrated schematically in FIG. 10. In such an arrangement, the anode 30 is disposed at the center of the cylinder, the membrane 40 being provided as a tube concentric with the anode 30, the cathode 31 being tubular in form and being concentric with the membrane 40 (the cathode preferably being formed to allow liquid passage therethrough) and a casing 45 surrounds the entire assembly. Preferably, a plurality of baffles 46 are provided extending radially between the casing 45 and the membrane 40 so that in effect a common anode chamber 31 is provided cooperating with a plurality (e.g. six) cathode chambers 33 formed there around, the baffles 46 being impermeable. Overflow means (cutouts and/or the dimensioning of the baffles 46) are provided between the various cathode chambers 33 to provide for communication between each of the cathode chambers 33. An inlet 47 is provided to one of the chambers 33, and an outlet 48 is provided for one of the chambers 33 adjacent to the inlet chamber, overflow means being provided between all of the chambers except the chambers containing the inlet 47 and the outlet 48. Chromium-contaminated water is fed into inlet 47 at the bottom of the inlet chamber 33, treated water is withdrawn from the outlet 48 at the top of the last chamber, and concentrated chromic acid collects in the anode chambers 31. Depending upon the end use to which the treated water is to be put (i.e. discharge, reused for chromium plating rinse water, etc.) the process will be carried out to produce water of any purity desired. For discharge into the environment, the water will be treated so that it has a concentration of less than 0.05 ppm, and in fact, concentrations as low as 0.01 ppm have been obtained. Chromium is recovered from the concentrated chromic acid by conventional techniques, acid concentration of at least about 10–16% being possible. Again, the degree of acid concentration achieved will be dependent upon whether or not, or to what extent, the chromium is to be recovered.

Depending upon the nature of the chromium contaminated water, it may be desirable to oxidize the chromium before feeding it to the inlet 47. For instance, where the contaminated water contains trivalent chromium, oxidation is practiced to oxidize the trivalent chromium to hexavalent chromium (which can be drawn into the anolyte). Additionally, where organics, cyanide, or cyanide metal complexes are present in the feedwater, oxidation is practiced to effect oxidation of such components. A conventional oxidation unit is illustrated in block form at 48 in FIG. 10 in the line feeding the contaminated water to the inlet 47. The oxidizer 48 may be any suitable conventional or prior art oxidizer, such as shown in application Ser. No. 841,925 filed Oct. 13, 1977 now U.S. Pat. No. 4,161,435.

Practicing a still further method according to the present invention, it is possible to produce chlorine by electrolyisis in a more efficient manner than has heretofore been possible. In FIGS. 11a 11b, suitable electrochemical cells for practicing the method of chlorine generation of the invention are illustrated diagrammatically, the cell in FIG. 11a being used for the production of sodium hydroxide and chlorine from water containing NaCl while the cell of FIG. 11b generates chlorine from water containing $CaCl_2$.

In practicing this method, a chlorine containing salt and water are fed into the anode chamber 31 and/or the cathode chamber 33, a current sufficient to produce electrolysis is applied to the anode 30, and the $Cl_2$ is withdrawn from the anode compartment 31, as indicated diagrammatically in FIGS. 11a and 11b. Where the salt is NaCL and the salt water is fed into anode compartment 31, the sodium ions pass through the membrane 40 into the cathode compartment to form sodium hydroxide, and are separately recoverable. When the NaCl and water is fed into the cathode chamber 33, the chlorine ions pass through the membrane 40 into the anode chamber 31, being liberated as $Cl_2$. In FIG. 11b, calcium chloride is the salt, and when the salt and water are fed into the anode compartment originally, the cations pass through the membrane 40 into the cathode chamber 33, forming Ca(OH), while the chlorine is liberated in the anode chamber 31. When the salt is originally fed into the cathode chamber 33, the chlorine ions pass through the membrane 40 into anode compartment 31. By practicing the method according to the invention, it is possible to produce chlorine (and sodium) directly from seawater with no pretreatment being necessary, and sodium and chlorine production can be achieved with much higher efficiency, especially in continuous operations. For instance, in conventional sodium cells, with ion exchange membranes NaOH is produced with a concentration of about 28% at a transfer efficiency of about 60%, while according to the present invention NaOH with a concentration of about 40% can be produced with a transfer efficiency of about 80%.

While particular exemplary processes that may be practiced according to the present invention have been set forth above, the membrane according to the present invention is also utilizable in and with many other processes. For instance phosphoric acid can be produced from phosphate slime (clay and phosphate rock mixed together), which is one of the waste products formed during the production of fertilizer from phosphate rock which presently cannot be properly disposed of. The membrane according to the invention can be used for the purification of any acid containing complex metals, in general producing anionic liquid and cationic material from a source liquid or semi-solid containing ions. This is usually accomplished with a Faraday efficiency of at least about 90%.

In practicing the methods described above, and other methods with which the membrane according to the present invention is utilizable, the anode and cathode materials will be selected from conventional materials that are suitable for the particular process involved. All of the above processes are capable of extended operation without membrane fouling when utilizing membrane assemblies according to the present invention, being operable for at least hundreds of hours, if not for months and years. There is no membrane potential of the membrane according to the invention, and they essentially do not foul even during extended operation.

All of the processes according to the present invention may be practiced as batch processes or continuous processes, both of which are within the scope of the claimed invention.

EXAMPLE 1

Simulated rinse water from chrome plating rinsing having 209 ppm hexavalent chrome was continuously flowed at about 18-20 ml/min. through a system generally as indicated in FIG. 10. The cathode was graphite rods, the anode Pt plated titanium. The membrane was tubular, having an outside diameter of 5" and an inside diameter of 3.75", and was $9\frac{5}{8}$" high. The membrane was formed by alternating three layers of capillary material comprising Eaton-Dykman 950 paper, 0.007 in. thick and one layer of separation material comprising conventional polyethylene food wrapping 0.001 in. thick. The voltage applied was 34 volts, and the concentration of chrome in the anolyte was 1565 ppm. During continuous operation, the concentration of chrome achieved in the outlet water was 5-10 ppm, this concentration is sufficiently low for recirculation of the rinse water.

EXAMPLE 2

Simulated chrome plating rinse water having 104 ppm hexavalent chrome was treated in a batch process utilizing the same membrane and electrodes as set forth in EXAMPLE 1. 1.2 gals of rinse water was treated with an applied voltage of 34 volts, and after about 19 hours of operation the concentration of chrome in the catolyte was about 0.58 ppm. By increasing the voltage the concentration was reduced even further, ultimately to less than 0.05 ppm. The same membrane as used in this test and in EXAMPLE 1 was utilized continuously for hundreds of hours without clogging, chemical degradation or swelling. Chromic acid has been concentrated in the anolyte up to about 16%, and typical Faraday efficiencies have been 15-25% at 100 ppm (feed water) and below, 35-45% at about 1000 ppm, and 70-90% at 60,000 ppm and higher.

EXAMPLE 3

ECM Sludge, approximately 600 ml., was placed into the center compartment of a dialysis cell as illustrated in FIG. 8. The anolyte and catholyte were originally water. The cathode was 304 stainless steel and the anode was expanded Pt sheet. A voltage of about 12 v was applied over a period of about 4 hours. Both of the membranes were constructed of interlayers of 3 sheets of capillary material comprising Eaton-Dykman 250 paper about 0.005 in. thick, and a width of about 0.375 in., and a single layer of separation material comprising conventional polyethylene food wrap 0.001 in. thick. At the completion of operation, the anolyte was approximately 600 ml. of 23% $HNO_3$, the catholyte was approximately 14% NaOH, and the material in the central chamber comprised about 550 ml. of $H_2O$ of a pH of about 5.8, and about 50 ml. sludge, which was in the form of metal hydroxides approximately 90% of which was iron hydroxide. The sludge was non-toxic, and could be removed through precipitation, filtration, or evaporation.

EXAMPLE 4

Utilizing a system generally as illustrated in FIG. 6a, 500 ml. of raw contaminated phosphoric acid from a fertilizer production process using Florida phosphate rock was fed into the middle compartment 42. Both membranes 40 and 41 were formed of 3 layers of Eaton Dykman 250 paper each about 0.006 in. thick to 1 layer of conventional polyethylene food wrap 0.001 in. thick, the membranes being about 0.375 in. wide. Gypsum pond water (pH about 1) was added to the cathode chamber 33, and water to the anode chamber 31. The cathode was graphite and the anode was platinized titanium. The initial voltage applied was about 4 volts, with an initial current of 10 amps. After 3-4 hours of operation, about 28% phosphoric acid was removed from chamber 31 having a metal content of $\frac{1}{2}$ the metal content of the raw phosphoric acid. Precipitates were formed in the chamber 33, which when analyzed revealed aluminum, iron, and other hydroxides, and the supernatant liquid in chamber 33 was green in color—indicating the presence of vanadium—and was radioactive—indicating the presence of uranium. The concentration of uranium in the liquid was determined to be about 140 ppm, and the vanadium concentration was estimated to be about 100 ppm.

EXAMPLE 5

Utilizing a system generally as illustrated in FIG. 6c, with the compartments 42, 42' filled with Dixon #2 graphite flakes and all of the membranes 40, 41 as provided in Example 4, 500 ml. of raw phosphoric acid, as in Example 4, was introduced into chamber 42, with distilled water in the other compartments. The initial voltage applied was 25 volts, and this was reduced to 3-4 volts as the phosphate anion transfered to the anolyte and steady state conditions were achieved, the current being approximately 11 amps. at steady-state conditions. After approximately 21 hours of operation, 25% food grade phosphoric acid was produced in the anolyte, having a specific gravity of about 1.24. The acid transfer efficiency during testing was about 170% of which 80% are Faraday current efficiency and the rest produced by electrophoresis as a result of the graphite being present.

EXAMPLE 6

Utilizing a system as illustrated in FIG. 11b, approximately 450 g. of $CaCl_2$ was dissolved in 1 liter of water, and was placed in both the anode and cathode chambers, 31, 33. The membrane 40 was as described in Example 4, and further tests with substantially identical results were conducted with a membrane 40 comprising alternating layers of asbestos paper about 0.002 in. thick and 0.375 in. in width, and conventional polyethylene food wrap 0.001 in. thick. The anode was platinized titanium, and the cathode was graphite. The applied voltage was held at about 9-13 volts with a current density of approximately 0.27 amp/in.$^2$ (6 amp. with a membrane area of about 22 in.$^2$). Chlorine was liberated at the anode chamber 31 with an initial Faraday efficiency of about 60% which increased to approximately 89-95% after about 20 minutes when steady state conditions were reached, staying at this level until the depletion of the $CaCL_2$ became excessive. Utilizing the same potential and current density with $CaCl_2$ in the anode chamber only, and utilizing an all-paper membrane, (i.e. not containing layers of polyethene foil) the maximum Faraday efficiency achieveable was 60–65%. Similar tests were done with the layered membrane described above with ferric chloride, magnesium chloride, and sodium chloride with similar voltage applications, and similar Faraday efficiencies were achieved with each.

EXAMPLE 7

The demineralization of hard water was practiced utilizing apparatus generally as indicated in FIG. 7, only containing a single central chamber 42 and one cathode chamber 33. 500 ml. of hard water having a hardness of 120 ppm (as $CaCO_3$) was introduced into central compartment 42. The membranes 40, 41 were the same, each as described in Example 4. The cathode was 304 stainless steel and the anode was ruthenium dioxide coated titanium. The voltage applied was about 30 volts, and the current about 1–2 amps. The current was applied for about 1 hr., after which time the water in chamber 42 was tested to have a hardness of 17 ppm (as $CaCO_3$).

EXAMPLE 8

Utilizing a system generally as illustrated in FIG. 9, 750 ml. of manganese-containing leach water was introduced into the cathodic chamber, with distilled water in the anode chamber. The chambers were separated with a membrane comprising alternating layers of Eaton-Dykman 250 paper each about 0.006 in. thick to 1 layer of conventional polyethylene film 0.001 in. thick, the width of the membrane being approximately 0.375 in. The anode was platinized titanium and the cathode was graphite. Application of four volts for 9 hours resulted in greater than 99% removal of manganese as manganese hydroxide and an equal recovery of sulfuric acid of suitable quality for reuse as a leaching agent. Supernatant water from the manganese precipitate was of dischargeable quality.

It will thus be seen that according to the present invention a membrane assembly and electrochemical cells utilizing same have been provided which are inexpensive, capable of operation over long periods of time without fouling, efficient, have no membrane potential, and have numerous advantages over prior art membranes and electrochemical cells. Additionally, a number of processes utilizing the membrane assembly—or like membrane assemblies—and electrochemical cells have been provided which heretofore were not possible to accomplish, or were accomplished with much less efficiency.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to accomplish all equivalent assemblies and methods.

What is claimed is:

1. A method of concentrating hexavalent chromium utilizing an electrolysis system including a block of ion-transfer membrane material, means defining an electrode chamber in the block extending the length of the height of the block, and anode disposed in the electrode chamber in the block, and a cathode formed to allow liquid passage therethrough surrounding the membrane material block, with a casing surrounding the cathode, the method comprising the steps of:

passing chromium contaminated water into the casing, between the casing and the cathode;

effecting circulation of the chromium contaminated water around the periphery of the cathode, the water passing through the cathode into operative association with the membrane;

supplying DC current to the anode and cathode to effect concentration of the hexavalent chromium from the chromium contaminated water in the chamber within the membrane; and withdrawing relatively pure water from the casing and withdrawing concentrated chromic acid from the chamber within the membrane block.

2. A method as recited in claim 1 wherein the chromium contaminated water is chromium plating rinse water.

3. A method of concentrating hexavalent chromium, utilizing an electrolysis system including an anode chamber having an anode and anolyte, and a cathode chamber including a cathode and catholyte, and a membrane between the anode chamber and the cathode chamber, the membrane comprising an anion permeable, non-ionic, semi-permeable or water impermeable non-permselective membrane capable of providing passage of anions thereacross over extended operations without destructive swelling, clogging, chemical reaction, or consumption thereof; the method consisting of the steps of:

passing water contaminated with hexavalent chromium into the cathode chamber in steady contact with the cathode;

subjecting the water contaminated with hexavalent chromium to electrolysis to effect concentration of the hexavalent chromium in the anolyte; and withdrawing relatively purer water from the cathode chamber and concentrated chromic acid from the anode chamber.

4. A method as recited in claim 3 wherein the water contaminated with hexavalent chromium also includes trivalent chromium, and comprising the further step of oxidizing the trivalent chromium to hexavalent chromium before passing the water contaminated with chromium to the cathode chamber.

5. A method as recited in claims 3 or 4 utilizing a plurality of series connected cathode chambers with a common anode chamber, the anode and cathode chambers being separated by an anion permeable membrane, and wherein said method is practiced by feeding chromium contaminated water to the bottom of the first cathode chamber; supplying current of sufficient strength to effect electrolysis to the anode; and withdrawing water having less than 1 ppm chromium from the top of the last cathode chamber.

6. A method as recited in claim 5 wherein the water formed has less than about 0.01 ppm chromium.

7. A method as recited in claim 3 comprising the further step of oxidizing the contaminants in the contaminated water before subjecting the water to electrolysis.

8. A method as recited in claim 3 practiced to achieve a Faraday efficiency of at least about 35% with an initial hexavalent chromium concentration of about 1000 ppm.

9. A method as recited in claim 3 wherein the water withdrawn from the cathode chamber is used for chromium plating rinsing.

10. A method of concentrating hexavalent chromium, utilizing an electrolysis system including an anode chamber having an anode and anolyte, and a cathode chamber including a cathode and catholyte, and a membrane between the anode chamber and the cathode chamber, the membrane comprising an anion permeable, non-ionic, semi-permeable or water impermeable non-permselective membrane capable of providing passage of anions thereacross over extended operations without destructive swelling, clogging, chemical reaction, or consumption thereof; the method consisting of the steps of:

passing chromium plating rinse water contaminated with hexavalent chromium into the cathode chamber in steady contact with the cathode;

subjecting the water contaminated with hexavalent chromium to electrolysis to effect concentration of the hexavalent chromium in the anolyte; and withdrawing relatively purer water from the cathode chamber and concentrated chromic acid from the anode chamber.

11. A method of concentrating hexavalent chromium, utilizing an electrolysis system including an anode chamber having an anode and anolyte, and a cathode chamber including a cathode and catholyte, and a membrane between the anode chamber and the cathode chamber, the membrane comprising an anion permeable, non-ionic, semi-permeable or water impermeable non-permselective membrane capable of providing passage of anions thereacross over extended operations without destructive swelling, clogging, chemical reaction, or consumption thereof; the method comprising the steps of:

passing chromium plating rinse water, contaminated with hexavalent chromium, into the cathode chamber in steady contact with the cathode;

subjecting the chromium plating rinse water to electrolysis to effect concentration of the hexavalent chromium in the anolyte; and withdrawing relatively pure water from the cathode chamber and concentrated chromic acid from the anode chamber.

12. A method as recited in claim 3 wherein the chromium plating rinse water has a chromium concentration of about 209 parts per million or less.

13. A method as recited in claim 11 comprising the further step of returning the water withdrawn from the cathode chamber for chromium plating rinsing.

* * * * *